United States Patent [19]
Gamou et al.

[11] Patent Number: 5,571,251
[45] Date of Patent: Nov. 5, 1996

[54] VEHICLE USING HYDROGEN ABSORBING ALLOYS

[75] Inventors: Takaharu Gamou, Fujiidera; Noboru Taniguchi, Osaka; Junji Niikura, Hirakata; Kazuhito Hatoh, Daito; Eiichi Yasumoto, Katano; Kinichi Adachi, Takarazuka, all of Japan

[73] Assignee: Matsushita Electric Industrial Co., Ltd., Kadoma, Japan

[21] Appl. No.: 503,845

[22] Filed: Jul. 18, 1995

Related U.S. Application Data

[62] Division of Ser. No. 166,505, Dec. 13, 1993, Pat. No. 5,469,913.

[30] Foreign Application Priority Data

Dec. 18, 1992 [JP] Japan .................... 4-338420

[51] Int. Cl.$^6$ ............................ B60H 13/02; B60H 1/32
[52] U.S. Cl. ............ 165/42; 165/104.12; 62/46.2; 62/244
[58] Field of Search ............ 165/104.12, 42, 165/244; 62/46.2

[56] References Cited

U.S. PATENT DOCUMENTS

| | | | |
|---|---|---|---|
| 4,179,896 | 12/1979 | Buchner et al. | 62/7 |
| 4,436,539 | 3/1984 | Ron et al. | 62/4 |
| 4,441,326 | 4/1984 | Bernauer et al. | 62/7 |
| 4,599,867 | 7/1986 | Retallick | 62/48 |
| 4,700,046 | 10/1987 | Fristedt | 219/202 |
| 4,784,217 | 11/1988 | Payre et al. | 165/104.12 |
| 4,928,496 | 5/1990 | Wallace et al. | 62/46.2 |
| 4,944,159 | 7/1990 | Crozat | 62/112 |
| 5,048,299 | 9/1991 | Retallick | 62/46.2 |

FOREIGN PATENT DOCUMENTS

| | | |
|---|---|---|
| 0131869 | 1/1985 | European Pat. Off. |
| 2615602 | 11/1988 | France |
| 3047023 | 7/1982 | Germany |
| 57-115655 | 7/1982 | Japan |
| 22892 | 2/1983 | Japan |
| 47988 | 3/1983 | Japan |
| 61-128072 | 6/1986 | Japan |
| 61-285357 | 12/1986 | Japan |
| 280345 | 12/1986 | Japan |
| 1210768 | 8/1989 | Japan |
| 291072 | 11/1989 | Japan |

*Primary Examiner*—Allen J. Flanigan
*Attorney, Agent, or Firm*—Renner, Otto, Boisselle & Sklar, P.L.L.

[57] ABSTRACT

A vehicle using hydrogen absorbing alloys includes: a plurality of hydrogen absorbing alloy storing vessels for independently storing a plurality of hydrogen absorbing alloys with a different hydrogen equilibrium decomposition pressure; a connecting section for passing hydrogen to and fro among the plurality of hydrogen absorbing alloy storing vessels; and a heating section for heating a low pressure hydrogen absorbing alloy which has the lowest hydrogen equilibrium decomposition pressure among the plurality of hydrogen absorbing alloys, using the combustion heat from fuel of an internal combustion engine or an external combustion engine of the vehicle as a heat source. Heat of reaction generated by absorption or desorption of hydrogen is utilized for heating or cooling the air in a passenger compartment or a component of the vehicle. The connecting section includes a hydrogen gas storing vessel.

8 Claims, 6 Drawing Sheets

VEHICLE USING HYDROGEN ABSORBING ALLOYS

This is a division of application Ser. No. 08/166,505, filed Dec. 13, 1993 now U.S. Pat. No. 5,469,913.

BACKGROUND OF THE INVENTION

1. Field of the Invention

The present invention relates to a vehicle using hydrogen absorbing alloys. More particularly, the present invention relates to a vehicle using hydrogen absorbing alloys for cooling and heating equipment, 2. Description of the Related Art As conventional cooling and heating equipment used in a vehicle, the following have mainly been used: a compressor type operated by consuming energy from part of the engine driving section through a fan belt, etc. and using freon; an electric compressor type where a storage battery is charged and the electric power of the charged storage battery is consumed; and an external heating vapor compressor type, such as a Stirling engine, using external heat as a driving source. Conventionally, each component of the vehicle is mainly heated by means of resistance heating of an electric heater, and is rarely equipped with an independent simple cooling equipment.

The compressor type of cooling equipment has a pollution problem due to the use of specific freon (R12 for a car air conditioner, and R22 for a refrigerator). Demand for a portable refrigerator and/or freezer for a car such as a camper has been greatly increased due to the popularization of outdoor leisure. Additionally, the surface temperature of components, especially that of a steering wheel of the vehicle is increased, for example in summer. Therefore, demand is greatly increased for cooling equipment for cooling the air in the passenger compartment and/or each component of the vehicle as soon as possible after the vehicle is started. Furthermore, there is also a great demand for heating equipment for rapidly heating the air in the passenger compartment and/or each seat of the vehicle, for example in winter.

The compressor type cooling and heating equipment, using the engine driving section, inevitably load the engine and thus disadvantageously lower the efficiency of the engine, thereby worsening the efficiency of the fuel. Disadvantages of the electric compressor type ones using a storage battery are that the storage battery is exhausted earlier; and the cooling or heating power depends upon the electric capacity of the storage battery, so that the cooling or heating capacity is relatively lowered unless the storage battery has a large electric capacity.

The external heat vapor compressor type can advantageously utilize exhaust heat of the engine, but they disadvantageously have a high cost requiring a complicated manufacturing process so as to have a more precise and airtight structure since the pressure of the inside of the external combustion engine is up to several tens of atmospheres. In addition, conventional cooling and heating equipment is generally of vapor compressor type utilizing freon as a heating medium, which causes serious problems of noise and vibration, and destruction of ozone layers, contrary to the environmental protection movement.

SUMMARY OF THE INVENTION

According to one aspect of this invention, a vehicle using hydrogen absorbing alloys includes a plurality of hydrogen absorbing alloy storing vessels for independently storing a plurality of hydrogen absorbing alloys with a different hydrogen equilibrium decomposition pressure; a connecting section for passing hydrogen to and fro among the plurality of hydrogen absorbing alloy storing vessels; and a heating section for heating a low pressure hydrogen absorbing alloy which has the lowest hydrogen equilibrium decomposition pressure among the plurality of hydrogen absorbing alloys, by using combustion heat of fuel of an internal combustion engine or an external combustion engine of the vehicle as a heat source; when the heating section heats the low pressure hydrogen absorbing alloy so that hydrogen is desorbed from the low pressure hydrogen absorbing alloy and then is absorbed by a high pressure hydrogen absorbing alloy of the plurality of hydrogen absorbing alloys, the high pressure hydrogen absorbing alloy having a hydrogen equilibrium decomposition pressure higher than that of the low pressure hydrogen absorbing alloy, exothermic heat generated by absorption of hydrogen by the high pressure hydrogen absorbing alloy is utilized for heating the air in a passenger compartment or a component of the vehicle; when hydrogen is desorbed from the high pressure hydrogen absorbing alloy, endothermic heat generated by desorption of hydrogen from the high pressure hydrogen absorbing alloy is utilized for cooling the air in the passenger compartment or the component of the vehicle; when hydrogen is desorbed from the high pressure hydrogen absorbing alloy and then is absorbed by the low pressure hydrogen absorbing alloy, exothermic heat generated by absorption of hydrogen by the low pressure hydrogen absorbing alloy is utilized for heating the air in the passenger compartment or the component of the vehicle; and the connecting section includes a hydrogen gas storing vessel.

According to another aspect of the invention, the vehicle using hydrogen absorbing alloys, includes at least three hydrogen absorbing alloy storing vessels for independently storing at least three hydrogen absorbing alloys with a different hydrogen equilibrium decomposition pressure, a connecting section for passing hydrogen to and fro among the plurality of hydrogen absorbing alloy storing vessels; and a heating section for heating a low pressure hydrogen absorbing alloy which has the lowest hydrogen equilibrium decomposition pressure among the plurality of hydrogen absorbing alloys, using combustion heat of fuel of an internal combustion engine or an external combustion engine of the vehicle as a heat source; wherein, when the heating section heats the low pressure hydrogen absorbing alloy so that hydrogen is desorbed from the low pressure hydrogen absorbing alloy and then is absorbed by a high pressure hydrogen absorbing alloy of the plurality of hydrogen absorbing alloys, the high pressure hydrogen absorbing alloy having a hydrogen equilibrium decomposition pressure higher than that of the low pressure hydrogen absorbing alloy, exothermic heat generated by absorption of hydrogen by the high pressure hydrogen absorbing alloy is utilized for heating the air in a passenger compartment or a component of the vehicle; when hydrogen is desorbed from the high pressure hydrogen absorbing alloy, endothermic heat generated by desorption of hydrogen from the high pressure hydrogen absorbing alloy is utilized for cooling the air in the passenger compartment or the component of the vehicle; and when hydrogen is desorbed from the high pressure hydrogen absorbing alloy and then is absorbed by the low pressure hydrogen absorbing alloy, exothermic heat generated by absorption of hydrogen by the low pressure hydrogen absorbing alloy is utilized for heating the air in the passenger compartment or the component of the vehicle.

In one embodiment of the invention, a reversible hydrogen absorption and desorption cycle between the high pressure hydrogen absorbing alloy and the low pressure hydrogen absorbing alloy is performed at a speed in a range from 3 cycles per hour (20 minutes/cycle) to 6 cycles per hour (10 minutes/cycle).

In another embodiment of the invention, the heat capacity of the hydrogen absorbing alloy storing vessel is not more than that of the hydrogen absorbing alloy stored therein.

In another embodiment of the invention, the void fraction of the hydrogen absorbing alloy storing vessel is in the range of 40 to 75%.

In another embodiment of the invention, each of the plurality of hydrogen absorbing alloy storing vessels is in a tube-like shaped, and the longitudinal direction of each of the plurality of hydrogen absorbing alloy storing vessels is horizontally maintained.

In another embodiment of the invention, a cooling medium of the fuel of the internal combustion engine or the external combustion engine is used as the heat source for heating the low pressure hydrogen absorbing alloy.

In another embodiment of the invention, exhaust gas generated by combustion of the fuel of the internal combustion engine or the external combustion engine is used as the heat source for heating the low pressure hydrogen absorbing alloy.

According to another aspect of the invention, the vessel using hydrogen absorbing alloys, includes a plurality of hydrogen absorbing alloy storing vessels for independently storing a plurality of hydrogen absorbing alloys with a different hydrogen equilibrium decomposition pressure, a connecting section for passing hydrogen to and fro among the plurality of hydrogen absorbing alloy storing vessels; and a heating section for heating a low pressure hydrogen absorbing alloy which has the lowest hydrogen equilibrium decomposition pressure among the plurality of hydrogen absorbing alloys, using combustion heat of fuel of an internal combustion engine or an external combustion engine of the vehicle as a heat source; when the heating section heats the low pressure hydrogen absorbing alloy so that hydrogen is desorbed from the low pressure hydrogen absorbing alloy and then is absorbed by a high pressure hydrogen absorbing alloy of the plurality of hydrogen absorbing alloys, the high pressure hydrogen absorbing alloy having a hydrogen equilibrium decomposition pressure higher than that of the low pressure hydrogen absorbing alloy, exothermic heat generated by absorption of hydrogen by the high pressure hydrogen absorbing alloy is utilized for heating the air in a passenger compartment or a component of the vehicle; when hydrogen is desorbed from the high pressure hydrogen absorbing alloy, endothermic heat generated by desorption of hydrogen from the high pressure hydrogen absorbing alloy is utilized for cooling the air in the passenger compartment or the component of the vehicle; when hydrogen is desorbed from the high pressure hydrogen absorbing alloy and then is absorbed by the low pressure hydrogen absorbing alloy, exothermic heat generated by absorption of hydrogen by the low pressure hydrogen absorbing alloy is utilized for heating the air in the passenger compartment or the component of the vehicle; and heat is directly exchanged between at least one of the hydrogen absorbing alloy storing vessels and the component.

In one embodiment of the invention, the component is a steering wheel.

In another embodiment of the invention, the component is a seat.

As is described above, the present invention provides an energy saving type of vehicle with minimization of pollution, in which the exhaust heat of the vehicle is utilized to drive the heat pump using the hydrogen absorbing alloys, and the endothermic reaction and the exothermic reaction of the hydrogen absorbing alloys are utilized for air-conditioning and for heating or cooling each component of the vehicle.

Thus, the invention described herein makes possible the advantage of providing a vehicle using hydrogen absorbing alloys for an energy saving type of cooling and heating equipment with minimization of pollution, without consuming the electric energy of a battery or a generator, nor using polluting materials such as freon as a heating medium but instead efficiently using excess heat or waste heat, the cooling and heating equipment being of a non-freon type and a low noise type not including a vibrating portion, thus contributing to environmental protection.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrating examples with reference to drawings and tables.

EXAMPLE 1

Some kinds of metals and alloys rapidly and reversibly absorb and desorb an extremely large amounts of hydrogen at temperatures over a wide range from about −100 C. to about +700 C. Such kinds of metals and alloys are herein referred to as hydrogen absorbing alloys. A large quantity of heat of reaction is generated while hydrogen is absorbed by or desorbed from such hydrogen absorbing alloys. Generally, heat of reaction generated by absorption of hydrogen is called exothermo (which heats the ambient air), and that generated by desorption of hydrogen is called endothermo (which cools the ambient air). Such principles can be utilized for manufacturing cooling and heating equipment using hydrogen absorbing alloys, such as a heat pump to be used in a vehicle using hydrogen absorbing alloys. For this purpose, two kinds of hydrogen absorbing alloys having a different hydrogen equilibrium decomposition pressure, i.e., a low pressure hydrogen absorbing alloy and a high pressure hydrogen absorbing alloy are used together so as to pass hydrogen between them utilizing a differential in the hydrogen equilibrium decomposition pressures thereof. The hydrogen equilibrium decomposition pressure is well known as a plateau pressure of Pressure-Composition-Temperature (P-C-T) characteristics of hydrogen absorbing alloys. As a result, endothermic heat is generated by desorption of hydrogen from one kind of hydrogen absorbing alloys, while exothermic heat is generated by absorption of hydrogen by the other kind; the former can be utilized for a cooling system, and the latter can be utilized for a heating system. By using two or more pairs of two kinds of hydrogen absorbing alloys and shifting each thermodynamic cycle thereof, it is possible to create successive thermal energy conversion cycles.

The heat pump using the hydrogen absorbing alloys can be utilized for heat amplification, cooling, and heating systems. Such a heat pump can advantageously be operated at temperatures in a wide range of about −100 C. to about 700 C., so that it can utilize various kinds of heat including low-temperature heat such as solar energy, and high-temperature heat such as industrial exhaust heat and exhaust heat of an engine. Furthermore, the heat pump can minimize noise and pollution.

The coefficient of performance (COP) of the heat pump can be represented as a ratio of an effective heat capacity to a total applied heat capacity. For example, the COP of a refrigerating cycle of the heat pump is given by the following equation:

$$COP=\{H_2T_L-Cp_2(T_M-T_L)\}/\{H_1T_L-Cp_1(T_H-T_M)\}$$

wherein, H denotes heat generated by absorption or desorption of hydrogen by the hydrogen absorbing alloy, $Cp_1$ and $Cp_2$ denote heat capacities of two kinds of alloys, $T_H$, $T_M$, and $T_L$ denote a high temperature, a middle temperature, and a low temperature, respectively. To increase the COP value represented by the above equation, a multi-effect type of absorption refrigerating machine or the like has been proposed.

Figure 1:
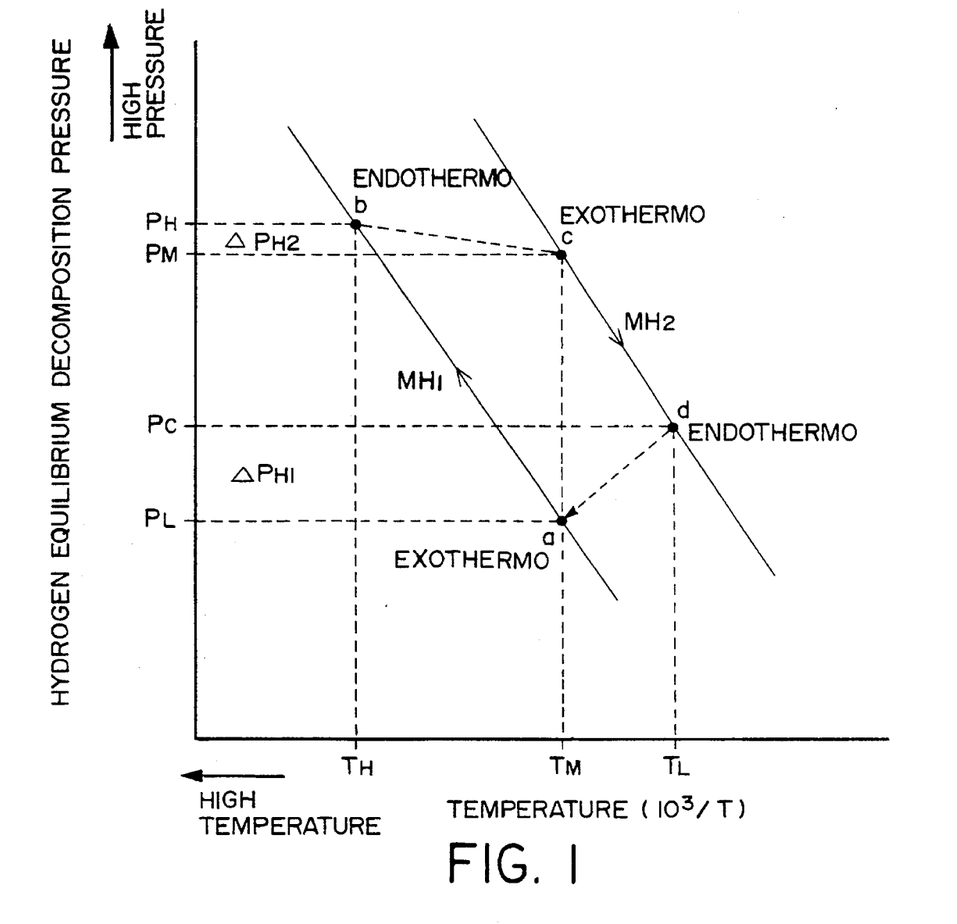
FIG. 1 is a P-T diagram showing the basic thermodynamic cycles of hydrogen absorbing alloys used in a heat pump according to the present invention.

First, various hydrogen absorbing alloys were prepared for manufacturing a heat pump which was operated at basic thermodynamic cycles shown in FIG. 1, and then characteristics of the hydrogen absorbing alloys were evaluated. FIG. 1 is a thermodynamic diagram in terms of inverse numbers of absolute temperatures and hydrogen equilibrium decomposition pressures, a so called P-T diagram, of two kinds of hydrogen absorbing alloys (a low pressure hydrogen absorbing alloy $MH_1$ and a high pressure hydrogen absorbing alloy $MH_2$), showing how the heat pump using the hydrogen absorbing alloys was operated. A solid line drawn on the side of lower pressures (higher temperatures) in FIG. 1 shows an operation of the low pressure hydrogen absorbing alloy $MH_1$ and a solid line drawn on the side of higher pressures (lower temperatures) shows an operation of the high pressure hydrogen absorbing alloy $MH_2$. At a point a, the lower pressure hydrogen absorbing alloy $MH_1$ exothermically absorbs hydrogen, and at a point b, the low pressure hydrogen absorbing alloy $MH_1$ is heated by high temperature exhaust heat or the like and is allowed to endothermically desorb hydrogen. Thereafter, at a point c, the high pressure hydrogen absorbing alloy $MH_2$ exothermically absorbs hydrogen, and at a point d, the high pressure hydrogen absorbing alloy $MH_2$ endothermically desorbs hydrogen, which is then absorbed by the low pressure hydrogen absorbing alloy $MH_1$, thus returning to the point a. According to the heat pump of the present invention, the endothermic reaction of the high pressure hydrogen absorbing alloys $MH_2$ at the point d is utilized for a cooling system, while the exothermic reaction of the low pressure hydrogen absorbing alloy $MH_1$ at the point a is utilized for a heating system. In FIG. 1, $P_{H1}$ and $P_{H2}$ each denote a difference of hydrogen pressures between the two kinds of hydrogen absorbing alloys $MH_1$ and $MH_2$, at respective reaction starting time. Herein, $P_H$ (a maximum pressure at a maximum temperature), $P_M$ (a operation pressure of the high pressure hydrogen absorbing alloy $MH_2$ at ambient temperature), $P_L$ (an operation pressure of the low pressure hydrogen absorbing alloy $MH_1$ at ambient temperature), and $P_C$ (an operation pressure of the high pressure hydrogen absorbing alloy $MH_2$ during a cooling mode) each represent a hydrogen pressure at each point.

Various kinds of hydrogen absorbing alloys were tested using the clockwise cycle of a→b→c→d→a as shown in FIG. 1, and evaluated with respect to a reaction rate (exothermic reaction generated by absorption of hydrogen and endothermic reaction generated by desorption of hydrogen), a quantity of exothermic heat generated by exothermic reaction and that of endothermic heat generated by endothermic reaction, an amount of effective absorbed hydrogen and that of effective desorbed hydrogen, stability of the hydrogen equilibrium decomposition pressure, hysteresis property, durability, and the like. In view of the above test results, and uniformity and cost of each hydrogen absorbing alloy, Laves phase alloys were found to be preferable for use in the present invention, the Laves phase alloys being represented by AB (wherein, A is one or more elements selected from the group consisting of Ti, Zr, and Hf, B is one or more elements selected from the group consisting of Mn, V, Fe, Ni, Cr, Co, Cu, Zn, Al, Si, Nb, Mo, W, Mg, Ca, Y, Ta, Pd, Ag, Au, Cd In, Sn, Bi, La, Ce, Mm, Pr, Nd, Th, and Sm, is in a range of 1.3 to 2.9, Mm is a mixture of rare earth element (lanthanoids), and A and B are different elements), and having a crystal structure which belongs to hexagonal crystal system of C14 ($MgZn_2$) type or cubic crystal system of C15 ($MgCu_2$) type. In addition, Ca or Mm alloys having an $AB_5$ type crystal structure (wherein A and B are different elements), more preferably those having a $CaCu_5$ type crystal structure were found to be suitable in the present invention. Such alloys reversibly absorbed and desorbed a large amount of hydrogen rapidly and readily at temperatures not higher than 700 C., and generated heat of reactions was large in quantity.

Figure 2:
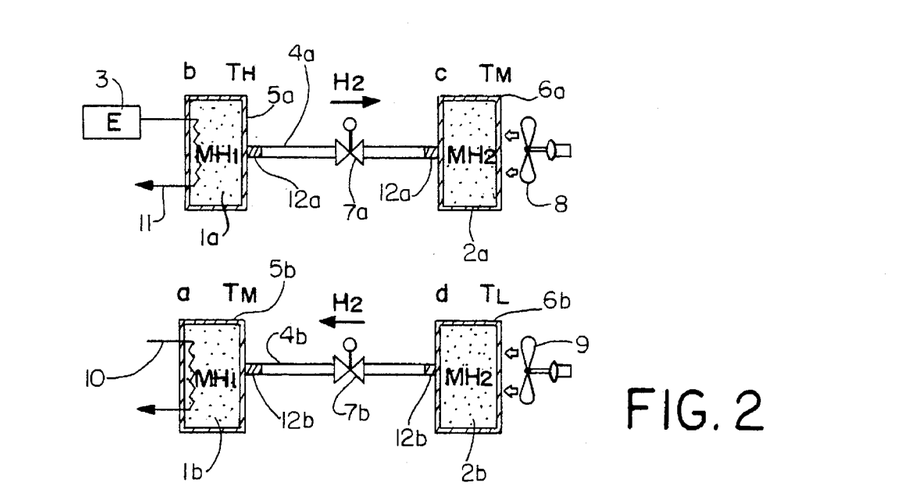
FIG. 2 shows a structure for a heat pump to be used in a vehicle using hydrogen absorbing alloys according to a first example of the present invention.

FIG. 2 schematically shows a structure for a heat pump to be used in a vehicle using hydrogen absorbing alloys according to the present example. Herein, the heat pump using the hydrogen absorbing alloys of the present example uses two or more pairs of hydrogen absorbing alloys having a different hydrogen equilibrium decomposition pressure (the low pressure hydrogen absorbing alloy $MH_1$ and the high pressure hydrogen absorbing alloy $MH_2$). Herein, as shown in FIG. 2, a first pair of a low pressure hydrogen absorbing alloy $MH_1$ 1a and a high pressure hydrogen absorbing alloy $MH_2$ 2a, and a second pair of a low pressure hydrogen absorbing alloy $MH_1$ 1b and a high pressure hydrogen absorbing alloy $MH_2$ 2b are used. The first and second pairs are connected to each other by pipings 4a and 4b. The low pressure hydrogen absorbing alloys $MH_1$ 1a and $MH_1$ 1b are stored at hydrogen absorbing alloy storing vessels 5a and 5b, respectively. The high pressure hydrogen absorbing alloys $MH_2$ 2a and $MH_2$ 2b are stored in hydrogen absorbing alloy storing vessels 6a and 6b, respectively. The hydrogen absorbing alloy storing vessels 5a, 5b, 6a, and 6b each have a heat exchanging function. A connecting portion between the hydrogen absorbing alloy storing vessel 5a and the piping 4a, and a connecting portion between the hydrogen absorbing alloy storing vessel 6a and the piping 4a are each provided with a filter 12a for preventing the hydrogen absorbing alloy powders from flowing out. Simultaneously, a connecting portion between the hydrogen absorbing alloy storing vessel 5b and the piping 4b, and a connecting portion between the hydrogen absorbing alloy storing vessel 6b and the piping 4b are each provided with a filter 12b for preventing the hydrogen absorbing alloy powders from flowing out. The pipings 4a and 4b are provided with hydrogen flow adjusting valves 7a and 7b, respectively. The low pressure hydrogen absorbing alloy $MH_1$ 1a is provided with a heating medium tube 11 for introducing exhaust heat of an internal combustion engine 3 of the vehicle. The low pressure hydrogen absorbing alloy $MH_1$ 2a is provided with a heating medium tube 10 for releasing the heat generated by the high pressure hydrogen absorbing alloy $MH_1$ 2a. The high pressure hydrogen absorbing alloy $MH_2$ 2a is provided with a radiating fan 8 for radiating the heat generated by the high pressure hydrogen absorbing alloy $MH_2$ 2a. The high pressure hydrogen absorbing alloy $MH_2$ 2b is provided with a cold air blowing fan 9 for introducing cold generated by the high pressure hydrogen absorbing alloy $MH_2$ 2b into a passenger compartment of the vehicle.

In FIG. 2, reference signs a, b, c, and d correspond to points a, b, c, and d of FIG. 1, respectively. In FIG. 2, an arrow indicates the direction of hydrogen flow. Each thermodynamic cycle of the first and second pairs of hydrogen absorbing alloys is shifted by half-cycle (herein, a cycle of $a \rightarrow b \rightarrow c \rightarrow d \rightarrow a$ is referred to as one cycle); so that the heat pump to be used in the vehicle using hydrogen absorbing alloys can be successively operated. In FIG. 2, the first pair of the low pressure hydrogen absorbing alloy $MH_1$ 1a and the high pressure hydrogen absorbing alloy $MH_2$ 2a is operated at a half cycle of $b \rightarrow c$, and the second pair of the low pressure hydrogen absorbing alloy $MH_1$ 1b and the high pressure hydrogen absorbing alloy $MH_2$ 2b is operated at a half cycle of $d \rightarrow a$. The first and second pairs have the substantially the same structure. For simplicity of explanation, components not relating to operations described herein are omitted. Hereinafter, an operation for the heat pump using the hydrogen absorbing alloys will be schematically described.

First, the low pressure hydrogen absorbing alloy $MH_1$ 1a is heated using exhaust gas of the engine 3 as a heat source. Hydrogen desorbed from the low pressure hydrogen absorbing alloy $MH_1$ 1a is absorbed by the high pressure hydrogen absorbing alloy $MH_2$ 2a. Heat generated at this time is removed by the radiating fan 8 (see the cycle $b \rightarrow c$ of FIG. 2). Subsequently, the low pressure hydrogen absorbing alloy $MH_1$ 1b is cooled by the use of the heating medium tube 10 so that hydrogen is desorbed from the high pressure hydrogen absorbing alloy $MH_2$ 2b. Consequently, the cold generated by the desorption of hydrogen is introduced into the passenger compartment of the vehicle by the cold air blowing fan 9 for cooling the air in the passenger compartment (see the cycle $d \rightarrow a$ of FIG. 2).

As the low pressure hydrogen absorbing alloys $MH_1$ 1a and 1b, 26 kg of $ZrMn_{1.5}Cr_{0.5}$ was used, and as the high pressure hydrogen absorbing alloys $MH_2$ 2a and 2b, 22 kg of $Ti_{0.8}Zr_{0.2}Mn_{0.8}Cr_{0.8}Cu_{0.4}$ was used. The hydrogen absorbing alloys $MH_1$ and $MH_2$ were both Laves phase alloys having a crystal structure which belongs to hexagonal crystal system of C14 type. Each hydrogen absorbing alloy was mechanically broken into pieces so as to have an average diameter of 100 m and stored in the hydrogen absorbing alloy storing vessel having a heat transfer function so that the vessel would have a void fraction of about 50%.

For improvement of hydrogen affinity of hydrogen absorbing alloys, the two kinds of alloys were independently subject to an initial activation. Each of the hydrogen absorbing alloys was allowed to desorb hydrogen using an oil-sealed rotary vacuum pump for three hours, and thereafter it was filled with hydrogen at a pressure of 45 atmospheres. After the repetition of such an operation, both of the hydrogen absorbing alloys could be made to readily absorb hydrogen within one hour. At this time, the maximum amount of absorbed hydrogen was: H/M (numbers of hydrogen atoms/numbers of alloy atoms)=1.1. Subsequently, the low pressure hydrogen absorbing alloy $MH_1$ was filled with hydrogen so that the amount of hydrogen of the low pressure hydrogen absorbing alloy $MH_1$ was: H/M=0.9.

Exhaust gas of the engine 3 was used as the heat source. At this time, the heat source could be made to have a temperature of about 500 C., and energy power of about 3.5 kW. In the present example, the exhaust gas was cooled to a temperature of about 400 C., and then was supplied to the low pressure hydrogen absorbing alloy $MH_1$. Herein, the hydrogen equilibrium decomposition of the low pressure hydrogen absorbing alloy $MH_1$ of $ZrMn_{1.5}Cr_{0.5}$ was about 35 atmospheres. Then, the low pressure hydrogen absorbing alloy $MH_1$ was cooled by the heating medium tube 10 using outside air down to a temperature of 45 C., and the high pressure hydrogen absorbing alloy $MH_2$ was cooled by the radiating fan 8 using outside air down to a temperature of 45 C. At the temperature of 45 C., the absorption pressure of the low pressure hydrogen absorbing alloy $MH_1$ was 0.01 atmosphere, and that of the high pressure hydrogen absorbing alloy $MH_2$ was 16 atmospheres. During the cooling mode, the high pressure hydrogen absorbing alloy $MH_2$ blew off air at a temperature of 0 C., and the vessel for storing the high pressure hydrogen absorbing alloy $MH_2$ had a temperature of $-5$ C. At the temperature, the hydrogen equilibrium decomposition pressure of the high pressure hydrogen absorbing alloy $MH_2$ was 2 atmospheres, and heat of reaction thereof was about 50 kcal/kg. An apparent specific gravity of the alloy was about 3.0, a void fraction (porosity of materials excluding hydrogen absorbing alloy) of the vessel was 50%, and the volume of the hydrogen absorbing alloy storing vessel was about 20 liters.

Hereinafter, the void fraction of the hydrogen absorbing alloy storing vessel will be described. When the void fraction was less than 40%, the hydrogen absorbing alloy was expanded in the volume by about 15% or more according to absorption of hydrogen, and was rapidly heated by the heat of reaction. Therefore, the repetition of the thermodynamic cycle makes the hydrogen absorbing alloy powders consolidated and sintered, which is prone to lead to the destruction of the hydrogen absorbing alloy vessel. In addition, the hydrogen absorbing capacity of the hydrogen absorbing alloy was lowered since the volume expansion of the hydrogen absorbing alloy was restricted by the limitation of the hydrogen absorbing alloy storing vessel. On the other hand, when the void fraction was beyond 75%, the percentage of the heat capacity of the hydrogen absorbing alloy to the total heat capacity of the hydrogen absorbing alloy storing vessel was reduced, thereby reducing the COP of the heat pump, and thus the heat efficiency of the hydrogen absorbing alloy was remarkably lowered, thereby consuming much energy. Therefore, the void fraction of the hydrogen absorbing alloy storing vessel should be in the range of 40 to 75%.

The ratio of the heat capacity of each hydrogen absorbing alloy to that of each hydrogen absorbing alloy storing vessel is preferably: heat capacity of the hydrogen absorbing alloy storing vessel/heat capacity of the hydrogen absorbing alloy $\leq 1.0$. Otherwise, much more calories will be required for heating or cooling the vessel itself, thereby reducing the COP, and thus the hydrogen absorbing alloy becomes uneconomic in practical use.

Table 1 shows the relationship between the cycle time (operating speed) and the cooling characteristics of the heat pump. As is apparent from Table 1, the slower the operating speed is (the longer the cycle time is), the higher the COP becomes. However, when the operating speed is too slowed down, the cooling output per hour is contrarily lowered. Generally, the increment in the reaction rate corresponds to the decrement in the operating speed of the heat pump, relatively. Therefore, the use of the hydrogen absorbing alloy having a higher reaction rate results in a high COP value, thus reducing the required amount of alloy. However, when the reaction rate of the hydrogen absorbing alloy is too high, a cooling output per hour is contrarily lowered. In the present example, it is found that the operating speed of 3 cycles/h (one cycle for 20 minutes) makes the cooling output per hour maximum (3669 kcal/h), and the best heat exchanging efficiency can be obtained when the operating speed is in a range of 3 to 6 cycles/h.

Figure 8:
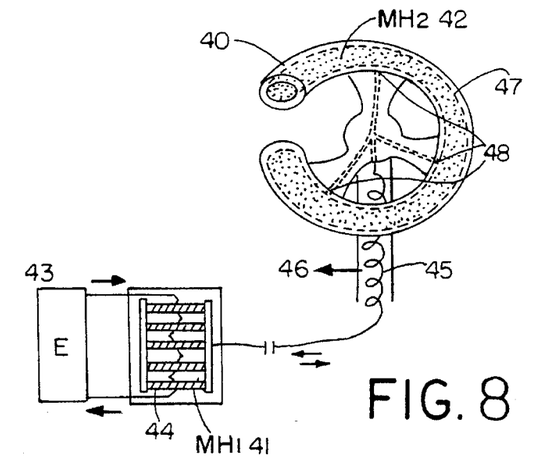
FIG. 8 shows a structure for a heat pump to be used in a vehicle using hydrogen absorbing alloys according to a second example of the present invention.

FIG. 8 shows an exemplary structure for the heat pump to be used in the vehicle using hydrogen absorbing alloys applied to the rapidly cooling equipment for the handle of the vehicle according to the second example of the present invention. In the present example, combustion heat of a Stirling engine 43 (which is one of the external combustion engines) is introduced into a low pressure hydrogen absorbing alloy $MH_1$ 41 by a seamless pipe made of copper phosphate 44 (weight: 2.4 kg) through a cooling medium, thereby obtaining a heat source having a temperature of about 150 C. An inner fin tube 47 inside a handle 40 is filled with a high pressure hydrogen absorbing alloy $MH_2$ 42 for outputting cold. The inner fin tube 47 is made of copper and is provided with an aluminum fin. A filter 48 (average diameter of openings: about 0.5 m) is provided for preventing hydrogen absorbing alloy powders from flowing out. The low pressure hydrogen absorbing alloy $MH_1$ 41 and the high pressure hydrogen absorbing alloy $MH_2$ 42 are connected to each other via a capillary tube 45.

As the low pressure hydrogen absorbing alloy $MH_1$ 41, 2 kg of $Ti_{0.35}Zr_{0.65}Mn_{1.2}Cr_{0.8}Co_{0.2}$ was used, while, as the high pressure hydrogen absorbing alloy $MH_2$ 42, 2 kg of $Ti_{0.8}Zr_{0.2}Mn_{0.8}Cr_{1.2}$ was used. The heat of reaction of the low pressure hydrogen absorbing alloy $MH_1$ 41 was 114 kcal, and that of the high pressure hydrogen absorbing alloy $MH_2$ 42 was 129 kcal. The low pressure hydrogen absorbing alloy $MH_1$ 41 had a hydrogen equilibrium decomposition pressure of 0.4 atmospheres and a reaction rate of 2.5 liter/g min at a temperature of 30 C. The void refraction of the vessel for storing the low pressure hydrogen absorbing alloy $MH_1$ 41 was about 70%. On the other hand, the high pressure hydrogen absorbing alloy $MH_2$ 42 had hydrogen equilibrium decomposition pressure of 11 atmospheres and a reaction rate of 1.5 liter/g min at a temperature of 30 C. The void refraction of the vessel for storing the high pressure hydrogen absorbing alloy $MH_2$ was about 50%.

In the present example, the high pressure hydrogen absorbing alloy $MH_2$ 42 for outputting heat is buried in the handle 40 to be cooled down, thereby achieving much more excellent heat efficiency than a conventional method in which a handle is indirectly cooled or heated using a heating medium. Moreover, the use of the filter is effective in preventing the powders from flowing out, and fixing the powders.

TABLE 1

| Cycle time (min) | 5 | 10 | 15 | 20 | 30 | 40 |
|---|---|---|---|---|---|---|
| Cycle/hour (hr) | 12 | 6 | 4 | 3 | 2 | 1.5 |
| Output cold (kcal/cycle) | 275 | 585 | 908 | 1223 | 1691 | 2178 |
| COP | 0.287 | 0.335 | 0.463 | 0.658 | 0.854 | 0.906 |
| Output cold per hour (kcal/hr) | 3305 | 3510 | 3632 | 3669 | 3381 | 3267 |

EXAMPLE 2

Figure 11:
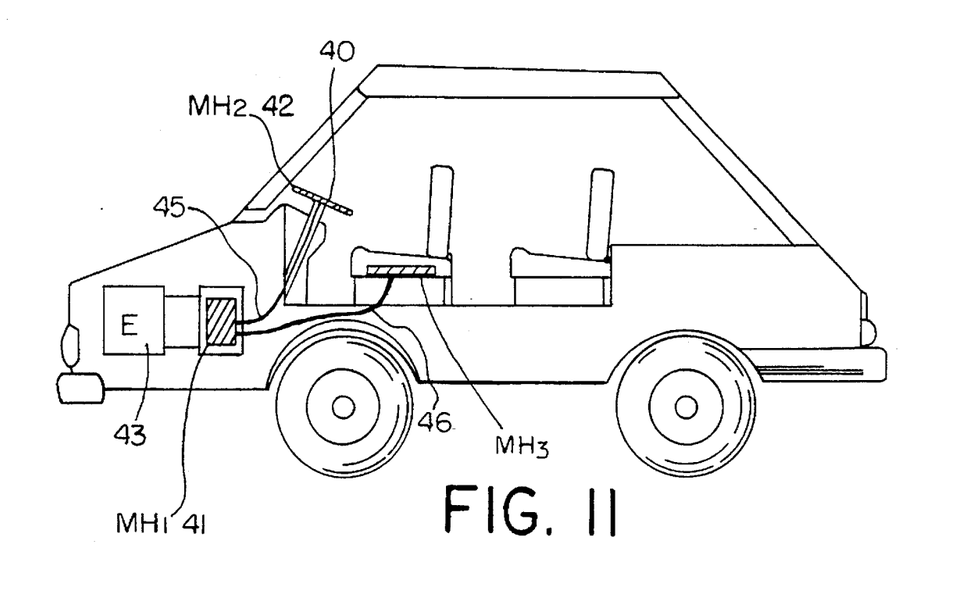
FIG. 11 shows a structure of a vehicle using hydrogen absorbing alloys according to a second example of the present invention.

FIG. 11 shows a structure of a vehicle using hydrogen absorbing alloys according to a second example of the present invention. The vehicle uses a heat pump using hydrogen absorbing alloys for a rapidly cooling equipment for the steering wheel of the vehicle. The heat pump utilize combustion heat of a Stirling engine 43 as a heat source for heating a low pressure hydrogen absorbing alloy $MH_1$ 41. A high pressure hydrogen absorbing alloy $MH_2$ 42 is filled in a handle 40 for outputting cold.

The heat capacity of the low pressure hydrogen absorbing alloy storing vessel was about 190 cal/deg. which was lower than that of the low pressure hydrogen absorbing alloy stored therein, and that of the high pressure hydrogen absorbing alloy storing vessel was about 200 cal/deg. which was lower than that of the high pressure hydrogen absorbing alloy stored therein. The sensible heat loss of each hydrogen absorbing alloy storing vessel was relatively small (about 10% of the heat of reaction of each hydrogen absorbing alloy). On the contrary, when the high pressure hydrogen absorbing alloy storing vessel had a heat capacity of about 380 cal/deg., the sensible heat loss due to the hydrogen absorbing alloy storing vessel was not less than about 30%. Thus, it is found that the heat capacity of the hydrogen absorbing alloy storing vessel should be less than that of the hydrogen absorbing alloy stored therein (i.e., the heat capacity ratio of the heat capacity of the hydrogen absorbing alloy storing vessel to that of the hydrogen absorbing alloy stored therein should be not more than 1.0), in order not to increase the heat loss due to the vessel. Each of the hydrogen absorbing alloy storing vessels is in a tube-like shape, and the longitudinal direction of each of the hydrogen absorbing alloy storing vessels is horizontally maintained. Moreover, the longitudinal direction of each hydrogen absorbing alloy storing vessel should be maintained horizontally rather than vertically in order to prevent the hydrogen absorbing alloy from consolidating and improve the durability thereof, which is also true for Example 1.

Figure 3:
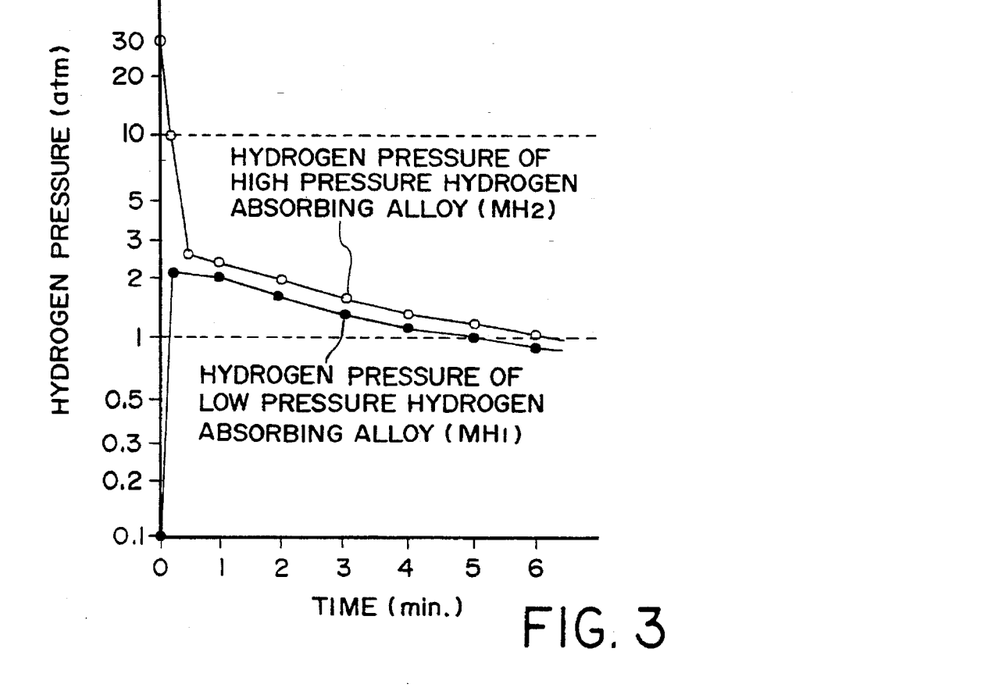
FIG. 3 is a graph showing hydrogen pressure versus time for a high pressure hydrogen absorbing alloy and a low pressure hydrogen absorbing alloy used in the heat pump according to the first example.
Figure 4:
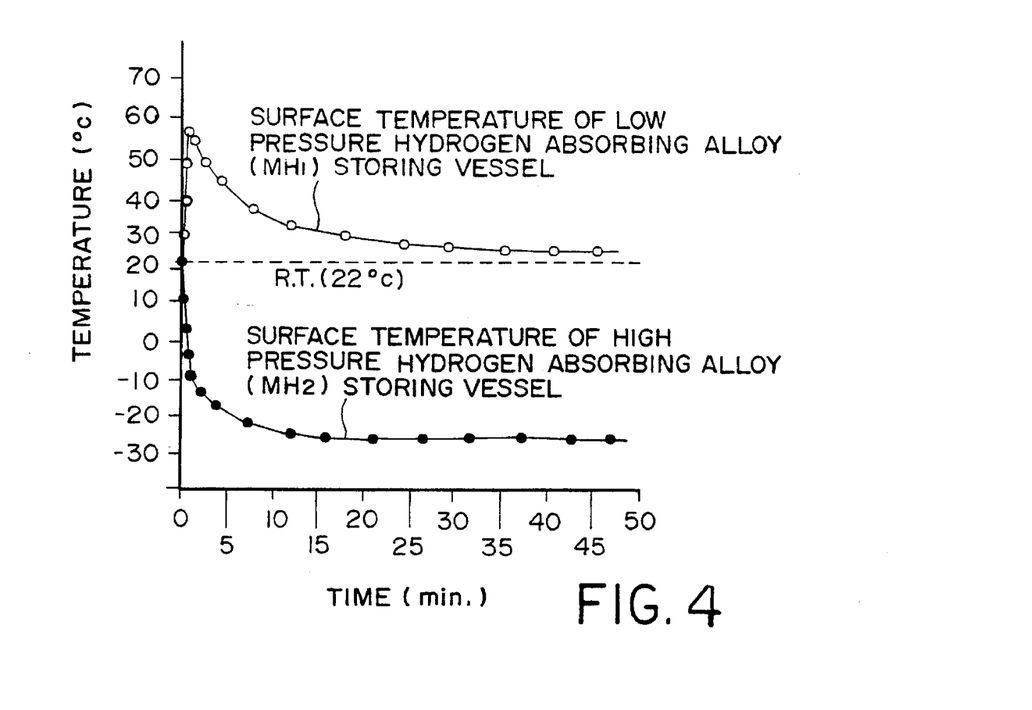
FIG. 4 is a graph showing temperature versus time for the high pressure hydrogen absorbing alloy and the low pressure hydrogen absorbing alloy used in the heat pump during a rapid cooling mode according to the first example.

FIG. 3 is a graph showing hydrogen pressures versus time with respect to two kinds of the hydrogen absorbing alloys $MH_1$ and $MH_2$. As shown in FIG. 3, the hydrogen pressures changed rapidly, which indicates that the rate of the absorption and desorption reaction is higher. FIG. 4 is a graph showing temperature versus time for the low pressure hydrogen absorbing alloy $MH_1$ and the high pressure hydrogen absorbing alloy $MH_2$ used in the heat pump. As shown in FIG. 4, 1 minute after the cooling mode starts, the high pressure hydrogen absorbing alloy $MH_2$ cooled down to a temperature of $-9.7$ C., 2 minutes later, to a temperature of $-13.1$ C., and finally 20 minutes later, to a temperature of $-25.2$ C. Thus, the equipment of the present example has an extremely high cooling rate, and thus it has excellent cooling characteristics compared with the prior art. In the first and second examples, the heat source is obtained by using the exhaust gas and the cooling medium, but the same effects can be obtained even if the heat source is directly obtained from a combustion chamber.

Figure 5:
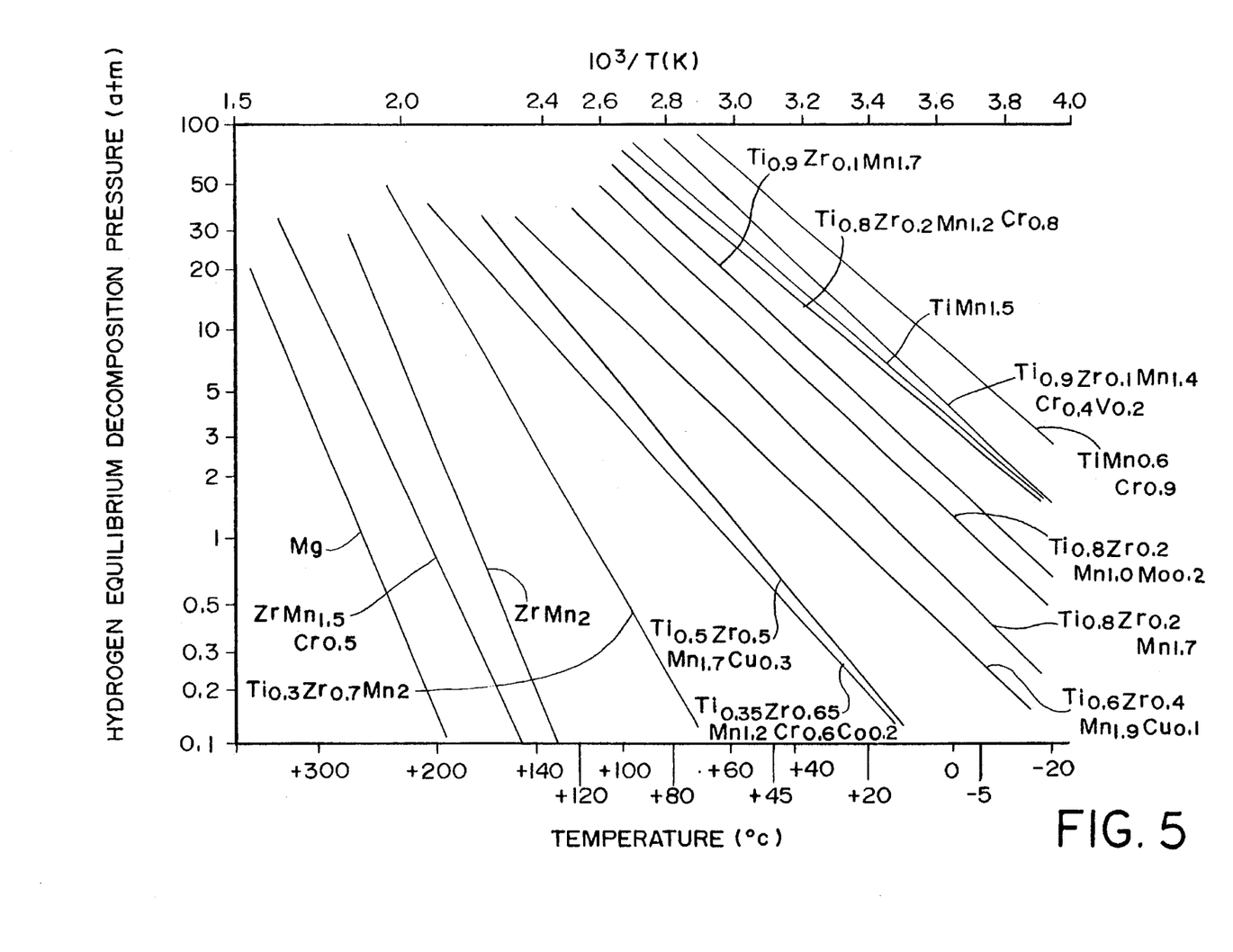
FIG. 5 is a P-T diagram for various representative hydrogen absorbing alloys used in the heat pump of the present invention.

FIG. 5 shows a P-T diagram for various representative hydrogen absorbing alloys to be used for the heat pump of the present invention. The representative hydrogen absorbing alloys are selected among Laves phase alloys which are represented by AB (wherein, A is one or more elements selected from the group consisting of Ti, Zr, and Hf, B is one or more elements selected from the group consisting of Mn, V, Fe, Ni, Cr, Co, Cu, Zn, Al, Si, Nb, Mo, W, Mg, Ca, Y, Ta, Pd, Ag, Au, Cd In, Sn, Bi, La, Ce, Mm, Pr, Nd, Th, and Sm, is in a range of 1.3 to 2.9, Mm is a mixture of rare earth element (lanthanoids), and A and B are different elements), and have a crystal structure which belongs to hexagonal crystal system of C14 type or cubic crystal system of C15 type. All of these representative hydrogen absorbing alloys were found to have excellent characteristics. Among them, C14 type Laves phase alloys containing Mn or Cr had especially excellent characteristics.

Table 2 shows composition formulas of representative hydrogen absorbing alloys to be used in the present invention, together with their respective absorbed hydrogen volumes (ml/g), desorbed hydrogen volumes (ml/g), stability of equilibrium decomposition pressure, and relative hysteresis characteristics. In Table 2, shows Excellent, shows Very Good, and shows Good. Herein, evaluation was carried out only for hydrogen absorbing alloys desorbing hydrogen in a volume of 100 ml/g or more. As is apparent from Table 2, the Laves phase alloys AB ($1.3 \leq \leq 2.9$) (alloy number 1 to 44) were found to have excellent characteristics. On the other hand, alloys AB ($>2.9$) were found to desorb much more hydrogen but absorb much less hydrogen. On the contrary, alloys AB ($<1.3$) were found to absorb much more hydrogen, but desorb much less hydrogen. Regarding the $AB_5$ type alloys, alloys in which the atom number ratio of B element to A element was about 5.0 (alloy number 45 to 48) had excellent characteristics, and especially alloys having $CaCu_5$ type crystal structure of Ca system (A site being Ca) and Mm system (A site being Mm) had more excellent characteristics.

| No. of Alloy | Alloy Composition Formula | Absorbed hydrogen volumes (ml/g) | Desorbed hydrogen volumes (ml/g) | Stability of HEDP* | Hysterisys characteristics |
| --- | --- | --- | --- | --- | --- |
| 1 | $TiMn_{1.5}$ | 208 | 187 | ○ | Δ |
| 2 | $ZrMn_{2.7}$ | 226 | 175 | ○ | Δ |
| 3 | $HfMn_{2.2}$ | 152 | 132 | Δ | Δ |
| 4 | $Zr_{0.5}Hf_{0.5}Mn_{1.6}$ | 135 | 129 | ○ | ○ |
| 5 | $ZrMn_{1.5}Sn_{0.5}$ | 130 | 124 | Δ | ○ |
| 6 | $ZrMn_{1.5}La_{0.7}$ | 214 | 183 | Δ | ○ |
| 7 | $ZrMn_{1.5}Ce_{0.8}$ | 201 | 174 | Δ | ○ |
| 8 | $ZrMn_{2.0}Ta_{0.8}$ | 123 | 117 | Δ | Δ |
| 9 | $ZrMn_{1.1}Ni_{0.2}$ | 145 | 128 | Δ | ○ |
| 10 | $TiFe_{1.2}V_{0.8}$ | 156 | 148 | Δ | Δ |
| 11 | $ZrV_{1.5}Fe_{0.5}$ | 187 | 145 | Δ | ○ |
| 12 | $ZrMn_{1.5}Mg_{0.6}$ | 117 | 111 | Δ | ○ |
| 13 | $ZrMn_{1.5}Ca_{0.7}$ | 143 | 125 | Δ | ○ |
| 14 | $TiMn_{1.5}Zn_{0.4}$ | 136 | 129 | Δ | ○ |
| 15 | $ZrMn_{1.8}Al_{1.0}$ | 126 | 120 | Δ | Δ |
| 16 | $ZrMn_{1.5}Si_{0.4}$ | 118 | 102 | Δ | ○ |
| 17 | $ZrMn_{1.5}Hf_{1.1}$ | 135 | 128 | ⊙ | ○ |
| 18 | $ZrMn_{1.5}V_{1.4}$ | 160 | 154 | ○ | ⊙ |
| 19 | $ZrMn_{2.0}Nb_{0.5}$ | 153 | 144 | ⊙ | ○ |
| 20 | $ZrMn_{1.9}Cr_{0.4}$ | 164 | 156 | ⊙ | ⊙ |
| 21 | $ZrV_{1.5}Mo_{0.5}$ | 138 | 130 | ○ | ⊙ |
| 22 | $ZrMn_{1.5}Cu_{0.6}$ | 152 | 142 | ○ | ⊙ |
| 23 | $ZrMn_{1.5}Co_{0.7}$ | 155 | 148 | ○ | ⊙ |
| 24 | $TiMn_{1.0}Ni_{0.4}$ | 179 | 172 | ⊙ | ○ |
| 25 | $ZrV_{0.2}Ni_{1.3}Cu_{0.4}$ | 156 | 148 | ⊙ | ○ |

-continued

| No. of Alloy | Alloy Composition Formula | Absorbed hydrogen volumes (ml/g) | Desorbed hydrogen volumes (ml/g) | Stability of HEDP* | Hysterisys characteristics |
|---|---|---|---|---|---|
| 26 | $Ti_{0.5}Zr_{0.5}V_{1.2}Co_{0.8}$ | 181 | 175 | ⊙ | ⊙ |
| 27 | $ZrMn_{1.5}Cu_{0.3}Ni_{0.2}$ | 171 | 165 | ○ | ⊙ |
| 28 | $ZrMn_{1.7}Cr_{0.3}Co_{0.2}$ | 162 | 153 | ○ | ⊙ |
| 29 | $ZrMn_{2.0}Cr_{0.3}V_{0.2}$ | 163 | 155 | ○ | ⊙ |
| 30 | $ZrNb_{0.3}Ni_{1.1}W_{0.2}$ | 124 | 109 | △ | ○ |
| 31 | $ZrLa_{0.6}Ni_{1.2}Mn_{0.2}$ | 159 | 147 | ○ | ○ |
| 32 | $TiV_{0.9}Mn_{1.2}Y_{0.7}$ | 168 | 140 | △ | ○ |
| 33 | $ZrMm_{0.2}Co_{1.2}Pd_{0.4}$ | 154 | 151 | ○ | ○ |
| 34 | $Ti_{0.7}Hf_{0.3}Fe_{0.8}V_{1.2}$ | 177 | 142 | △ | △ |
| 35 | $Ti_{0.8}Zr_{0.2}Mn_{1.4}Ni_{0.4}$ | 168 | 165 | ⊙ | ○ |
| 36 | $ZrV_{0.3}Cr_{1.0}Cu_{0.3}Mn_{0.3}$ | 189 | 176 | ○ | ⊙ |
| 37 | $TiV_{0.5}Ni_{1.0}Fe_{0.3}Mn_{0.3}$ | 171 | 163 | ○ | ○ |
| 38 | $Zr_{0.5}Hf_{0.5}Mn_{1.1}V_{0.2}Cr_{0.3}$ | 178 | 164 | ○ | ○ |
| 39 | $Ti_{0.8}Hf_{0.2}Cr_{0.8}Mm_{0.6}Au_{0.2}$ | 170 | 167 | ⊙ | ⊙ |
| 40 | $Ti_{0.2}Zr_{0.8}Cr_{1.1}Ta_{0.3}Sm_{0.8}$ | 173 | 168 | ○ | ⊙ |
| 41 | $Zr_{0.8}Hf_{0.2}Mn_{1.6}In_{0.2}V_{0.8}$ | 179 | 173 | ⊙ | ○ |
| 42 | $Ti_{0.2}Zr_{0.8}Mn_{1.7}Bi_{0.2}Cd_{0.2}$ | 165 | 160 | ⊙ | ○ |
| 43 | $Ti_{0.2}Zr_{0.8}Mn_{1.8}Ag_{0.2}Pr_{0.2}$ | 172 | 165 | ⊙ | ○ |
| 44 | $Ti_{0.8}Zr_{0.2}Mn_{1.8}Th_{0.2}Nd_{0.2}$ | 161 | 156 | ⊙ | ⊙ |
| 45 | $CaNi_{4.7}Co_{0.3}$ | 171 | 158 | ⊙ | ○ |
| 46 | $CaNi_{4.6}Mg_{0.2}$ | 156 | 149 | ○ | ○ |
| 47 | $MmNi_{4.7}Cu_{0.2}$ | 165 | 161 | ⊙ | ○ |
| 48 | $MmNi_{4.0}Cr_{0.1}Mn_{0.6}$ | 178 | 163 | ⊙ | ○ |

(*Hydrogen Equilibrium Decomposition Pressure)

EXAMPLE 3

Figure 6:
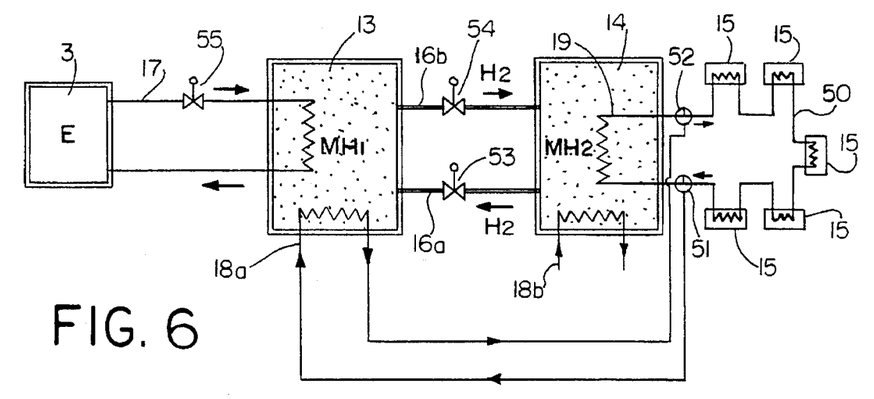
FIG. 6 shows a structure for a heating equipment for a seat of a vehicle according to a third example of the present invention.

FIG. 6 shows a structure for a heating equipment for a seat of a vehicle according to a third example of the present invention. In the present example, the combustion heat of an internal combustion engine 3 can be introduced into a low pressure hydrogen absorbing alloy $MH_1$ 13 via a cooling medium tube 17. The low pressure hydrogen absorbing alloy $MH_1$ 13 is connected to a high pressure hydrogen absorbing alloy $MH_2$ 14 via hydrogen conduits 16a and 16b. The heat of reaction generated by the low pressure hydrogen absorbing alloy $MH_1$ 13 or the high pressure hydrogen absorbing alloy $MH_2$ 14 is introduced into a heating medium tube 50 via a heating medium tube 18a or 19. By operating switching valves 51 and 52, either the heating medium tube 18a or the heating medium tube 19 is made to connect to the heating medium tube 50.

First, a heating operation of the equipment while the engine 3 is driven will be described. When a valve 55 is opened, the combustion heat of the engine 3 is introduced into the low pressure hydrogen absorbing alloy $MH_1$ 13 via the cooling medium tube 17. Thus heated low pressure hydrogen absorbing alloy $MH_1$ 13 is allowed to desorb hydrogen. At this time, if a valve 54 is opened, the high pressure hydrogen absorbing alloy $MH_2$ 14 absorbs hydrogen which is desorbed from the low pressure hydrogen absorbing alloy $MH_1$ 13, thereby generating heat of reaction. This heat of reaction is introduced into each seat 15 via the heating mediums 19 and 50 by operating the switching valves 51 and 52.

Next will be described a heating operation of the equipment when the vehicle is entirely cooled after the engine 3 stops running under conditions where the high pressure hydrogen absorbing alloy $MH_2$ 14 is filled with hydrogen. When a valve 53 is opened, the low pressure hydrogen absorbing alloy $MH_1$ 13 absorbs hydrogen which is desorbed from the high pressure hydrogen absorbing alloy $MH_2$ 14, thereby generating heat of reaction. This heat of reaction is introduced into each seat 15 via the heating medium tubes 18a and 50 by operating the switching valves 51 and 52.

In the present example, 12.5 kg of $Ti_{0.9}Zr_{0.1}Mn_{1.6}Cr_{0.2}V_{0.2}$ was used as the high pressure hydrogen absorbing alloy $MH_2$, and 14.0 kg of $MmNi_{4.7}Mn_{0.3}$ containing much La for Mm components was used as the low pressure hydrogen absorbing alloy $MH_1$. These alloys were each stored in a shell and tube type double copper tube on the side of the shell, the shell and tube type double copper tube being provided with an inner fin. A number of such copper tubes were tied up in a bundle and were stored in the heating medium tube, thus constituting a pair of heat exchangers. The equipment was found to have output heat of 160 kcal/h. As a result, the seat was heated so that the surface temperature became about 45 C. Herein, the heat of reaction of the high pressure hydrogen absorbing alloy $MH_2$ 14 and the low pressure hydrogen absorbing alloy $MH_1$ 13 was introduced into each seat 15 via the heating medium tubes 19 and 18a. However, vessels for storing the hydrogen absorbing alloys may be directly mounted on each seat so that the seat can be heated more rapidly.

EXAMPLE 4

Figure 7:
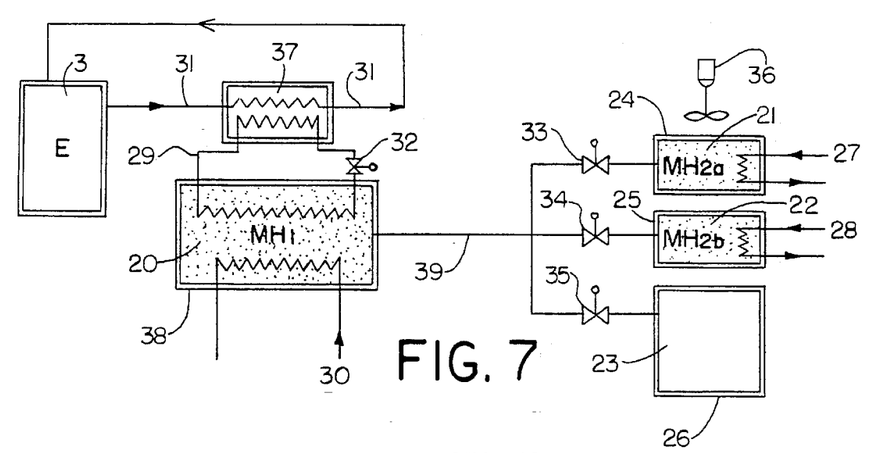
FIG. 7 shows a structure for a heat pump to be used in a vehicle using hydrogen absorbing alloys according to a fourth example of the present invention.

FIG. 7 shows a structure for a cooling and heating equipment in which a hydrogen gas storing vessel is arranged in parallel to the high hydrogen absorbing alloy $MH_2$. The exhaust heat of the engine 3 is utilized as a heat source, and is introduced into a heat exchanger 37 via a heating medium tube 31. When an opening valve 32 for the heating medium is opened, the heat source is introduced into the low pressure hydrogen absorbing alloy $MH_1$ 20 by the heating medium flowing through a heating medium tube 29, thereby heating the low pressure hydrogen absorbing alloy $MH_1$ 20 up to a temperature of 150 C. A high pressure hydrogen absorbing alloy $MH_{2a}$ 21 and a high pressure hydrogen absorbing alloy $MH_{2b}$ 22 are stored in hydrogen absorbing alloy storing vessels 24 and 25, respectively. The hydrogen equilibrium decomposition pressure of the high pressure hydrogen absorbing alloy $MH_{2a}$ 21 is higher than that of the high pressure hydrogen absorbing alloy $MH_{2b}$ 22.

The high pressure hydrogen absorbing alloys $MH_{2a}$ 21 and $MH_{2b}$ 22 output cold or heat, and thus outputted cold or heat is derived via heating medium tube 27 or 28. In the present example, a hydrogen gas storing vessel 26 is provided on a hydrogen passageway. The vessels 24, 25, and 26 are each connected to the low pressure hydrogen absorbing alloy $MH_1$ 20 via opening valves 33, 34, and 35, respectively. A radiating fan 36 is provided for removing heat generated during reverse reaction at the high pressure hydrogen absorbing alloys $MH_{2a}$ 21 and $MH_{2b}$ 22, or for utilizing the heat or cold for a heating or cooling system. A heating medium tube 30 is provided for removing heat generated when the low pressure hydrogen absorbing alloy $MH_1$ 20 absorbs hydrogen. In the present example, the weight of the low pressure hydrogen absorbing alloy $MH_1$ 20 was 40 kg, and those of the high pressure hydrogen absorbing alloys $MH_{2a}$ 21 and $MH_{2b}$ 22 were both 15 kg. The volume of the hydrogen gas storing vessel 26 was 300 liters, which was twenty five times as much as that of the low pressure hydrogen absorbing alloy $MH_1$ 20. In the present example, a Ti-Mn polycomponent system alloy having a C14 type crystal structure was used.

Figure 9:
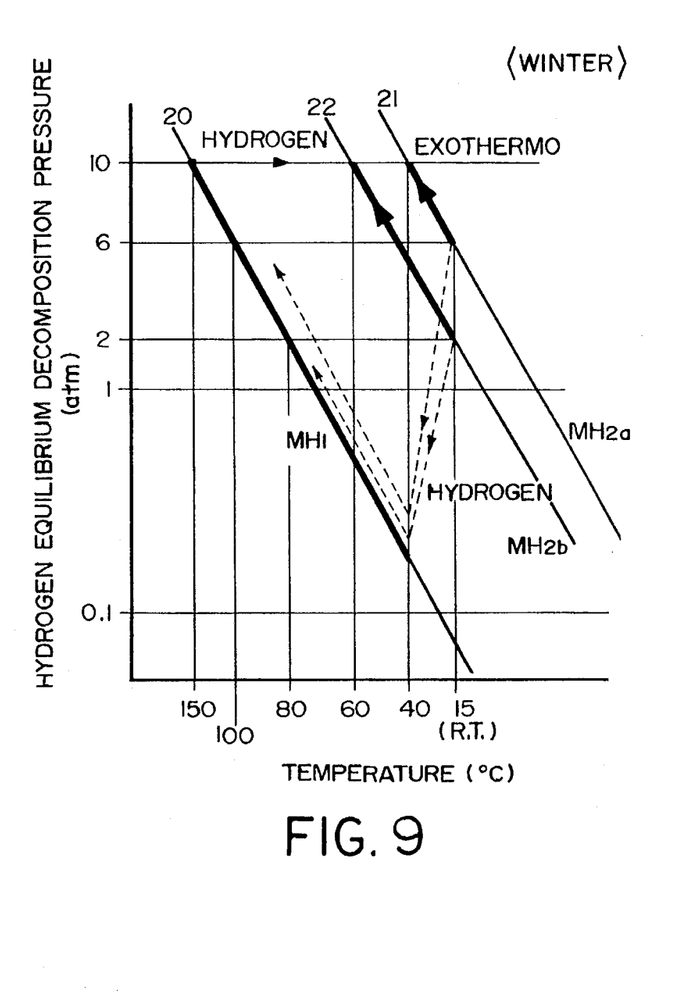
FIG. 9 is a P-T diagram showing the basic thermodynamic cycles of hydrogen absorbing alloys used in the heat pump during a heating mode according to the fourth example.

Next, an exemplary operation for a cooling and heating equipment of the present example will be described. First, a heating operation for the cooling and heating equipment to be used when the ambient temperature is low, for example in winter, will be described referring to a P-T diagram of FIG. 9. The P-T diagram of FIG. 9 shows basic thermodynamic cycles of hydrogen absorbing alloys used in the heat pump during a heating mode according to the present example.

First, an operation for heating the air in a passenger compartment of the vehicle while the engine 3 is driven will be described. When the engine 3 is driven, the low pressure hydrogen absorbing alloy $MH_1$ 20 is heated up to a temperature of 150 C. by the exhaust heat of the engine 3 (solid line on the side of the lowest pressure in FIG. 9), and then desorbed hydrogen is absorbed by the high pressure hydrogen absorbing alloys $MH_{2a}$ 21 and $MH_{2b}$ 22 in the hydrogen absorbing alloy storing vessels 24 and 25. In this case, only an opening valve 33 is first opened so that the hydrogen of the low pressure hydrogen absorbing alloy $MH_1$ 20 is transferred to the high pressure hydrogen absorbing alloy $MH_{2a}$ 21, thereby obtaining heat of about 40 C. (solid line on the side of the highest pressure of FIG. 9). When the high pressure hydrogen absorbing alloy $MH_{2a}$ 21 is almost fully charged with hydrogen, the thermal output begins to decrease. Then, the opening valve 33 is closed and an opening valve 34 is opened, so that the hydrogen can be introduced into the high pressure hydrogen absorbing alloy $MH_{2b}$ 22 having a hydrogen equilibrium decomposition pressure lower than that of the high pressure hydrogen absorbing alloy $MH_{2a}$ 21, thus obtaining heat of about 60 C. (solid line shown in the middle of FIG. 9). When the high pressure hydrogen absorbing alloy $MH_{2b}$ 22 is fully charged with hydrogen, the opening valve 34 is closed and then the opening valve 35 is opened, so that a hydrogen gas storing vessel 26 previously made empty is filled with hydrogen gas having a pressure of about 10 atmospheres.

As is described above, in order to warm the air in the passenger compartment of the vehicle, for example in winter, hydrogen desorbed by the low pressure hydrogen absorbing alloy $MH_1$ 20 is absorbed by the high pressure hydrogen absorbing alloy $MH_{2b}$ 22, and then is absorbed by the high pressure hydrogen absorbing alloy $MH_{2a}$ 21, thus gradually warming up the air in the passenger compartment. At this time, the absorption heat is derived by the radiating fan 36. Furthermore, the emptied hydrogen gas storing vessel 26 can be filled with hydrogen gas at a high pressure.

Below will be described a heating operation of the equipment according to the present example when the vehicle is entirely cooled after the engine 3 stops running under conditions where the high pressure hydrogen absorbing alloys $MH_{2a}$ 21 and $MH_{2b}$ 22 each absorb hydrogen at a pressure of 10 atmospheres, and the hydrogen gas storing vessel stores hydrogen having a pressure of 10 atmospheres. The opening valves 33 and 34 are opened, and thereby hydrogen is released from the high pressure hydrogen absorbing alloys $MH_{2a}$ 21 and $MH_{2b}$ 22, and is absorbed by the low pressure hydrogen absorbing alloy $MH_1$ 20. At this time, the hydrogen absorption heat generated by the low pressure hydrogen absorbing alloy $MH_1$ 20 is utilized as a heat source for heating the engine 3 via the heating medium tube 29, the heat exchanger 37, and the heating medium tube 31, before the engine 3 is driven. At this time, cold generated by the high pressure hydrogen absorbing alloys $MH_{2a}$ 21 and $MH_{2b}$ 22 is removed by the radiating fan 36. A damper (not shown) is switched to determine whether the heat obtained by the radiating fan 36 is utilized in a vehicle or removed outside.

The above operation will be described in detail referring to FIG. 9. First, the opening valve 34 is opened so that the hydrogen is transferred to the low pressure hydrogen absorbing alloy $MH_1$ 20 from the high pressure hydrogen absorbing alloy $MH_{2b}$ 22, thus obtaining heat of about 40 C. at an initial stage, and then obtaining heat of about 80 C. at a peak (broken line on the side of the lower pressures of FIG. 9). When hydrogen is not released from the high pressure hydrogen absorbing alloy $MH_{2b}$ 22 any more, the opening valve 34 is closed, and then the opening valve 33 is opened so that hydrogen is introduced from the high pressure hydrogen absorbing alloy $MH_{2a}$ 21 into the low pressure hydrogen absorbing alloy $MH_1$ 20, thus obtaining heat having a maximum temperature of 100 C. (broken line on the side of the higher pressures of FIG. 9). Next, the opening valve 33 is closed, and the opening valve 35 is opened, so that hydrogen gas having a pressure of 10 atmospheres is transferred from the hydrogen gas storing vessel 26 to the low pressure hydrogen absorbing alloy $MH_1$ and is stored therein, thereby obtaining heat of 150 C. at a peak.

Next, a cooling operation for the cooling and heating equipment to be used when the ambient temperature is high, for example in summer, will be described. The operation is basically performed in a manner similar to that of the above heating operation. That is, when heating the engine is not necessary, the heat generated by the low pressure hydrogen absorbing alloy $MH_1$ 20 is removed at the cooling medium tube 30, and cold generated by the high pressure hydrogen absorbing alloys $MH_{2a}$ 21 and $MH_{2b}$ 22 can be utilized for cooling the components using the radiating fan 36. In this case, when the engine 3 is at a room temperature, the opening valve 35 is opened, and the pressure of the hydrogen gas in the hydrogen gas storing vessel 26 is made much lower than 1 atmosphere.

Figure 10:
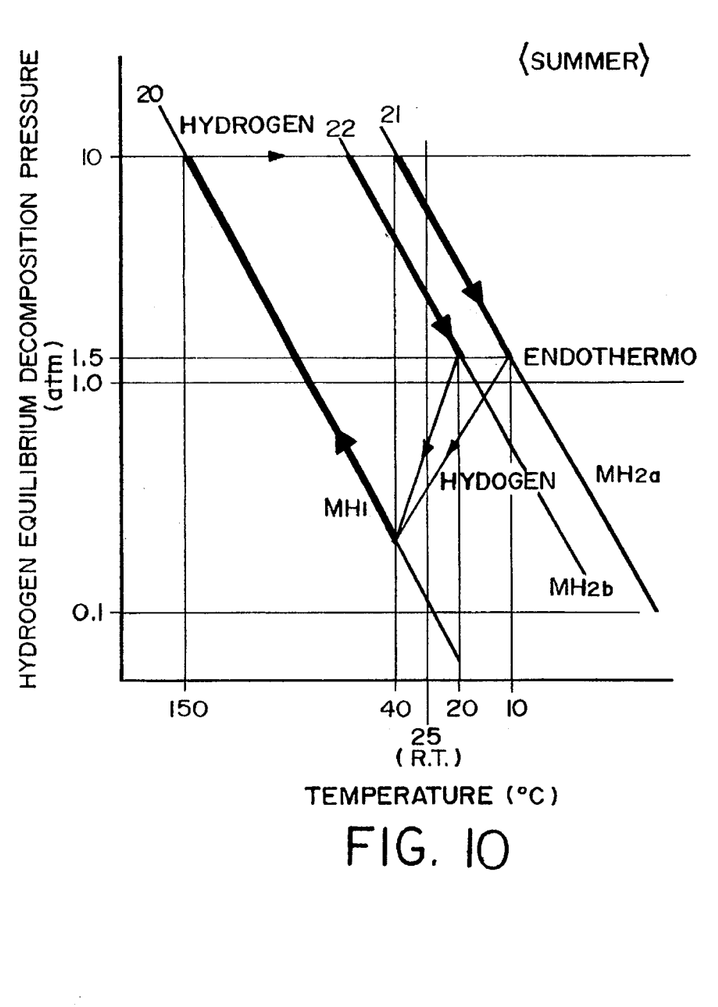
FIG. 10 is a P-T diagram showing the basic thermodynamic cycles of hydrogen absorbing alloys used in the heat pump during a cooling mode according to the fourth example.

The above operation will be described referring to a P-T diagram of FIG. 10. The P-T diagram of FIG. 9 shows basic thermodynamic cycles of hydrogen absorbing alloys used in the heat pump during a cooling mode according to the present example. First, the opening valve 34 is opened, so that hydrogen is released from the high pressure hydrogen absorbing alloy $MH_{2b}$ 22 to the low pressure hydrogen absorbing alloy $MH_1$ 20, thus obtaining heat of about 20 C. (solid line shown in the middle of FIG. 10). Next, when the hydrogen is not released from the high pressure hydrogen absorbing alloy $MH_{2b}$ 22 any more, the opening valve 34 is closed, and the opening valve 33 is opened, so that hydrogen is released from the high pressure hydrogen absorbing alloy $MH_{2a}$ 21 to the low pressure hydrogen absorbing alloy $MH_1$ 20, thus obtaining heat of 10 C. (solid line on the side of higher pressures of FIG. 10). However, the temperature of the low pressure hydrogen absorbing alloy $MH_1$ 20 is increased by absorption of hydrogen, and the hydrogen equilibrium decomposition pressure is gradually increased, and finally, no hydrogen is released from the high pressure hydrogen absorbing alloys $MH_{2a}$ 21 and $MH_{2b}$ 22. Therefore, the opening valve 33 is closed and the opening valve 35 is opened, and simultaneously, the opening valves 34 and 33 are opened in this order, thereby obtaining a low temperature of 5 C. The reason is that the pressure of the hydrogen in the hydrogen gas storing vessel 26 is maintained at about 0.1 atmosphere equivalent to the hydrogen equilibrium decomposition pressure of the low pressure hydrogen absorbing alloy $MH_1$ 20 at a temperature of 25 C., so that hydrogen is released from the high pressure hydrogen absorbing alloys $MH_{2a}$ 21 and $MH_{2b}$ 22.

To rapidly cool a component of the vehicle, such as a handle, the opening valves 33 and 34 are previously opened, and simultaneously, the opening valve 35 is opened, so that the hydrogen is released from the high pressure hydrogen absorbing alloys $MH_{2a}$ 21 and $MH_{2b}$ 22, thereby rapidly cooling such a component down to about 5 C.

In the case where the temperature of the low pressure hydrogen absorbing alloy $MH_1$ 20 is not sufficiently low, and the hydrogen is slowly transferred from the high pressure hydrogen absorbing alloys $MH_{2a}$ 21 and $MH_{2b}$ 22 to the low pressure hydrogen absorbing alloy $MH_1$ 20, hydrogen gas can be introduced into the hydrogen gas storing vessel 26, thereby facilitating the desorption of hydrogen from the high pressure hydrogen absorbing alloys $MH_{2a}$ 21 and $MH_{2b}$ 22.

As is described above, the provision of the hydrogen gas storing vessel makes it possible to rapidly perform the heating or cooling operation, and maintain the heating or cooling operation for a long time. The reason is that the heat of reaction of the hydrogen absorbing alloy is utilized for performing the heating or cooling operation, but at that time, it disadvantageously works for stopping the reaction, while the hydrogen is flown into or out from the hydrogen gas storing vessel without generating heat of reaction. That is, only the pressure of the hydrogen gas storing vessel and the equilibrium decomposition pressure of the hydrogen absorbing alloy determine the direction of the transfer of the hydrogen. Accordingly, the pressure of the hydrogen storing vessel can be set as desired during the operation of the heat pump.

In the present example, the high pressure hydrogen absorbing alloys $MH_{2a}$ 21 and $MH_{2b}$ 22 each has a different hydrogen equilibrium decomposition pressure, thus having a different reaction temperature and a different output temperature. Therefore, it is possible to desirably set a thermodynamic cycle, and determine a system structure in accordance with the temperature of the heat source to be used.

The maximum COP values of the heat pumps of the above-mentioned four examples were all 0.69 during the cooling mode, and 1.32 during the heating mode. These values are represented assuming that input energy is consumed. However, all of the heat pumps utilize the exhaust heat of the engine, which is generally wasted, thereby not necessitating any input energy at all. Thus, according to the present invention, efficient thermal energy for the cooling or heating operation can be obtained from waste energy, thus saving on energy.

As is described above, the vehicle of the present invention is novel in that the exhaust heat of the driving source is utilized for the heat pump to be used in the vehicle using hydrogen absorbing alloys. That is, the present invention provides the vehicle using the hydrogen absorbing alloys for the energy saving type cooling and heating equipment with a minimization of pollution, without consuming electric energy, or using a polluting material such as freon as the heating medium but instead efficiently using excess heat or waste heat, the cooling and heating equipment being of a non-freon type and a low noise type not including a vibrating portion, thus contributing to environmental protection. According to the present invention, components, especially the steering wheel of the vehicle can be rapidly cooled, for example in summer, and components, especially a seat can effectively be heated, for example in winter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A vehicle using hydrogen absorbing alloys, comprising:

a plurality of hydrogen absorbing alloy storing vessels for independently storing a plurality of hydrogen absorbing alloys with a different hydrogen equilibrium decomposition pressure, a connecting means for passing hydrogen fro and to among said plurality of hydrogen absorbing alloy storing vessels, said connecting means includes hydrogen flow adjusting valves, and a heating means for heating a low pressure hydrogen absorbing alloy which has the lowest hydrogen equilibrium decomposition pressure among said plurality of hydrogen absorbing alloys, using combustion heat of fuel of an internal combustion engine or an external combustion engine of said vehicle as a heat source, wherein, when said heating means heats said low pressure hydrogen absorbing alloy so that hydrogen is desorbed from said low pressure hydrogen absorbing alloy and then is absorbed by a high pressure hydrogen absorbing alloy of said plurality of hydrogen absorbing alloys, said high pressure hydrogen absorbing alloy having a hydrogen equilibrium decomposition pressure higher than that of said low pressure hydrogen absorbing alloy, exothermic heat generated by absorption of hydrogen by said high pressure hydrogen absorbing alloy is utilized for heating the air in a passenger compartment or a component of said vehicle;

when hydrogen is desorbed from said high pressure hydrogen absorbing alloy, endothermic heat generated by desorption of hydrogen from said high pressure hydrogen absorbing alloy is utilized for cooling the air in said passenger compartment or said component of said vehicle;

when hydrogen is desorbed from said high pressure hydrogen absorbing alloy and then is absorbed by said low pressure hydrogen absorbing alloy, exothermic heat generated by absorption of hydrogen by said low pressure hydrogen absorbing alloy is utilized for heating the air in said passenger compartment or said component of said vehicle; and heat is directly exchanged between at least one of said hydrogen absorbing alloy storing vessels, where said at least one of said hydrogen storing vessels stores a high pressure hydrogen absorbing alloy, and said component.

2. A vehicle according to claim 1, wherein said component is a handle.

3. A vehicle according to claim 1, wherein said component is a seat.

4. A vehicle according to claim 1, wherein the heat capacity of said hydrogen absorbing alloy storing vessel is not more than that of said hydrogen absorbing alloy stored therein.

5. A vehicle according to claim 1, wherein the void fraction of said hydrogen absorbing alloy storing vessel is in the range of 40 to 75%.

6. A vehicle according to claim 1, wherein each of said plurality of hydrogen absorbing alloy storing vessels is in a tube-like shape, and the longitudinal direction of each of said plurality of hydrogen absorbing alloy storing vessels is horizontally maintained.

7. A vehicle according to claim 1, wherein a cooling medium of said fuel of said internal combustion engine or said external combustion engine is used as said heat source for heating said low pressure hydrogen absorbing alloy.

8. A vehicle according to claim 1, wherein exhaust gas generated by combustion of said fuel of said internal combustion engine or said external combustion engine is used as said heat source for heating said low pressure hydrogen absorbing alloy.

* * * * *

UNITED STATES PATENT AND TRADEMARK OFFICE
CERTIFICATE OF CORRECTION

PATENT NO. : 5,571,251
DATED : November 5, 1996
INVENTOR(S) : Takaharu Gamou et al.

It is certified that error appears in the above-indentified patent and that said Letters Patent is hereby corrected as shown below:

At column 12, line 23, the symbol --⊙-- should be inserted before the phrase "shows Excellent".

At column 12, line 23, the symbol --○-- should be inserted before the phrase "shows Very Good".

At column 12, line 24, the symbol --△-- should be inserted before the phrase "shows Good".

At column 12, line 27, the formula "AB(1.3≤ ≤2.9)" should read --$AB_\alpha(1.3 \leq \alpha \leq 2.9)$--.

At column 12, line 29, the formula "AB(>2.9)" should read --$AB_\alpha(\alpha > 2.9)$--.

UNITED STATES PATENT AND TRADEMARK OFFICE
CERTIFICATE OF CORRECTION

PATENT NO. : 5,571,251
DATED : November 5, 1996
INVENTOR(S) : Takaharu Gamou et al.

It is certified that error appears in the above-indentified patent and that said Letters Patent is hereby corrected as shown below:

At column 12, line 31, the formula "AB(<1.3)" should read --$AB_\alpha(\alpha < 1.3)$--.

Signed and Sealed this

Eighth Day of July, 1997

Attest:

BRUCE LEHMAN

*Attesting Officer*          *Commissioner of Patents and Trademarks*